(12) United States Patent
Fereydoonzad et al.

(10) Patent No.: US 12,723,970 B2
(45) Date of Patent: Sep. 1, 2026

(54) SAMPLE-MAINTAINING SYSTEM FOR A MICROSCOPE, WELL PLATE ASSEMBLY COMPRISING THE SAME AND CORRESPONDING METHOD

(71) Applicant: SCIREQ—Scientific Respiratory Equipment Inc., Montréal (CA)

(72) Inventors: Liah Fereydoonzad, Montreal (CA); Percival Graham, Montreal (CA); Eddy Fraga, Laval (CA); Ben Urovitch, Cote-St-Luc (CA)

(73) Assignee: SCIREQ—SCIENTIFIC RESPIRATORY EQUIPMENT INC., Montreal (CA)

(*) Notice: Subject to any disclaimer, the term of this patent is extended or adjusted under 35 U.S.C. 154(b) by 600 days.

(21) Appl. No.: 18/063,282

(22) Filed: Dec. 8, 2022

(65) Prior Publication Data

US 2023/0184668 A1 Jun. 15, 2023

Related U.S. Application Data

(60) Provisional application No. 63/265,169, filed on Dec. 9, 2021.

(51) Int. Cl.
*G01N 21/01* (2006.01)
*G02B 21/34* (2006.01)

(52) U.S. Cl.
CPC ............ *G01N 21/01* (2013.01); *G02B 21/34* (2013.01)

(58) Field of Classification Search
CPC .... G01N 21/0303; G01N 21/01; G01N 1/312; G01N 15/0339; G01N 15/0806;
(Continued)

(56) References Cited

U.S. PATENT DOCUMENTS 5,463,223 A * 10/1995 Wong ................ G01N 21/3563 250/339.08
8,418,870 B2 * 4/2013 Song ................. B65D 43/0202 220/795

(Continued)

OTHER PUBLICATIONS (Harps) Slice Anchors & Kits, https://www.warneronline.com/slice-anchors-kits-harps, downloaded Mar. 3, 2023.

(Continued)

*Primary Examiner* — Jamil Ahmed
(74) *Attorney, Agent, or Firm* — Duane Morris LLP

(57) ABSTRACT

The present disclosure concerns a sample-maintaining system for a microscope, the sample-maintaining system comprising a ring-shaped outer member comprising a bottom-facing surface and having an inner peripheral surface at least partially delimiting an inner member-receiving through opening; and a ring-shaped inner member defining a sample-receiving through opening and comprising a bottom-contacting surface; the inner member being removably arranged in the inner member-receiving through opening of the outer member; wherein when the bottom-contacting surface of the inner member is supported onto a container bottom wall, the bottom-facing surface of the outer member is spaced apart therefrom. It also concerns a well plate assembly comprising the same, a corresponding microscope assembly and a corresponding method for holding down a microscope sample.

15 Claims, 8 Drawing Sheets

(58) Field of Classification Search
CPC ..... G01N 2021/6482; G01N 23/20025; G01N 23/2202; G02B 21/34
USPC ......... 356/440, 244, 246, 33–36; 73/864.91; 422/50, 430, 500, 536, 547–561; 435/283.1
See application file for complete search history.

(56) References Cited

U.S. PATENT DOCUMENTS

| | | | | |
|---|---|---|---|---|
| 11,143,594 | B2 * | 10/2021 | Connolly | G01N 24/12 |
| 2006/0104867 | A1 * | 5/2006 | Solazzi | B01L 3/508 422/547 |
| 2012/0167786 | A1 * | 7/2012 | Laugharn, Jr. | G01N 1/286 73/864.91 |

OTHER PUBLICATIONS

M.R.H. Hill, and S.A. Greenfield, “The membrane chamber: A new type of in vitro recording chamber”, Journal of Neuroscience Methods, vol. 195, Issue 1, Jan. 30, 2011, pp. 15-23.

* cited by examiner

SAMPLE-MAINTAINING SYSTEM FOR A MICROSCOPE, WELL PLATE ASSEMBLY COMPRISING THE SAME AND CORRESPONDING METHOD

PRIOR APPLICATION

The present application claims priority from U.S. provisional patent application No. 63/265,169, filed on Dec. 9, 2021, and entitled "SAMPLE-MAINTAINING SYSTEM FOR A MICROSCOPE AND CORRESPONDING METHOD", the disclosure of which being hereby incorporated by reference in its entirety.

TECHNICAL FIELD

The technical field relates to microscopes, and more particularly to sample-maintaining systems for microscopes, to well plate assemblies comprising the same and to corresponding methods for holding down a microscope sample.

BACKGROUND

When studying a microscope sample with a transmitted light microscope, it is important that the microscope sample be properly held down to allow unobstructed imaging while allowing a transport of dissolved gases and other molecules dissolved in water to the sample.

In view of the above, there is a need for a sample-maintaining system for a microscope which would be able to overcome or at least minimize some of the above-discussed prior art concerns.

BRIEF SUMMARY

It is therefore an aim of the present invention to at least partially address the above-mentioned issues.

According to a general aspect, there is provided a sample-maintaining system for a microscope, the sample-maintaining system comprising: a flexible film having a sample-facing side and an opposed maintaining member-supporting side, the flexible film being at least partially made of a material having a refractive index substantially similar to the refractive index of water; and a maintaining member defining a sample-receiving through opening superposed onto the maintaining member-supporting side of the flexible film, with the flexible film at least partially closing the sample-receiving through opening of the maintaining member.

According to another general aspect, there is provided a sample-maintaining system for a microscope, the sample-maintaining system comprising: an outer member having an inner peripheral surface at least partially delimiting an inner member-receiving through opening; an inner member defining a sample-receiving through opening and having an outer peripheral surface; and a flexible membrane; wherein the inner member is removably arranged in the inner member-receiving through opening of the outer member with the outer peripheral surface of the inner member facing at least partially the inner peripheral surface of the outer member and with the flexible membrane at least partially maintained between the outer peripheral surface of the inner member and the inner peripheral surface of the outer member and at least partially closing the sample-receiving through opening.

According to another general aspect, there is provided a sample-maintaining system for a microscope, the sample-maintaining system comprising: a ring-shaped outer member comprising a bottom-facing surface and having an inner peripheral surface at least partially delimiting an inner member-receiving through opening; and a ring-shaped inner member defining a sample-receiving through opening and comprising a bottom-contacting surface; the inner member being removably arranged in the inner member-receiving through opening of the outer member; wherein when the bottom-contacting surface of the inner member is supported onto a container bottom wall, the bottom-facing surface of the outer member is spaced apart therefrom.

According to another general aspect, there is provided a well plate assembly comprising: a well plate having an upper surface, at least one well being formed in the well plate and opening into the upper surface thereof, wherein the multi-well plate comprises at least one lower surface portion spaced apart from the upper surface and at least one cylindrical peripheral wall portion extending upwardly from said at least one lower surface portion to at least partially delimit therewith said at least one well, and at least one sample-maintaining system according to the present disclosure, said at least one sample-maintaining system being removably arranged in said at least one well, wherein the flexible membrane at least partially covers said at least one lower surface portion.

According to another general aspect, there is provided a microscope assembly, comprising: a light source; the well plate assembly according to the present disclosure; a microscope objective arranged below said at least one lower surface portion of the sample container; wherein, when in use, a sample is provided between the flexible membrane of the sample-maintaining system and said at least one lower surface portion.

According to another general aspect, there is provided a sample-maintaining system for a microscope, the sample-maintaining system comprising: an outer member having an inner peripheral surface and defining an inner member-receiving through opening at least partially delimited by the inner peripheral surface; an inner member defining a sample-receiving through opening and having an outer peripheral surface, the inner member being arranged in the inner member-receiving through opening of the outer member; and a flexible membrane comprising a peripheral border at least partially sandwiched between the outer peripheral surface of the inner member and the inner peripheral surface of the outer member and a sample-maintaining portion extending substantially across the sample-receiving through opening.

According to another general aspect, there is provided a sample-maintaining assembly for a microscope, comprising: an outer member assembly defining an inner member-receiving cavity and comprising a substantially transparent sample-supporting surface and a peripheral wall extending upwardly from the sample-supporting surface, the peripheral wall and the sample-supporting surface at least partially delimiting together the inner member-receiving cavity; an inner member defining a sample-receiving through opening and having an outer peripheral surface, the inner member being arranged in the inner member-receiving cavity of the outer member assembly; and a flexible membrane comprising a peripheral border at least partially sandwiched between the outer peripheral surface of the inner member and the peripheral wall of the outer member assembly and a sample-maintaining portion extending substantially across the sample-receiving through opening.

According to another general aspect, there is provided a multi-well plate assembly comprising: a multi-well plate having an upper surface, a plurality of wells being formed in the multi-well plate and opening into the upper surface thereof, wherein the multi-well plate comprises a plurality of lower surface portions spaced apart from the upper surface and a plurality of cylindrical peripheral wall portions extending upwardly from the plurality of lower surface portions to at least partially delimit therewith the plurality of wells, and at least one sample-maintaining system according to the present disclosure, said at least one sample-maintaining system being provided in one of the plurality of wells, wherein the flexible membrane at least partially covers the corresponding lower surface portion.

According to another general aspect, there is provided a microscope assembly, comprising: a light source; a sample container receiving light from the light source, the sample container defining a sample-receiving cavity and comprising a substantially transparent bottom wall at least partially delimiting the sample-receiving cavity; a sample-maintaining system according to the present disclosure arranged in the sample-receiving cavity and supported onto the bottom wall of the sample container; and a microscope objective arranged below the bottom wall of the sample container; wherein, when in use, a sample is provided between the flexible membrane of the tissue-maintaining system and the bottom wall.

According to another general aspect, there is provided a method for holding down a microscope sample, comprising: providing a sample container defining at least one sample-receiving cavity and comprising a substantially transparent sample-supporting surface at least partially delimiting the sample-receiving cavity; providing a microscope sample in said at least one sample-receiving cavity onto the sample-supporting surface; providing a sample-maintaining system comprising: an outer member having an inner peripheral surface at least partially delimiting an inner member-receiving through opening; an inner member defining a sample-receiving through opening and having an outer peripheral surface; and a flexible membrane; wherein the inner member is arranged in the inner member-receiving through opening of the outer member with the outer peripheral surface facing at least partially the inner peripheral surface of the outer member and with the flexible membrane at least partially maintained between the outer peripheral surface of the inner member and the inner peripheral surface of the outer member so as to at least partially close the sample-receiving through opening; and inserting the sample-maintaining system into said at least one sample-receiving cavity with the inner member surrounding the microscope sample and with the flexible membrane covering the microscope sample.

According to another general aspect, there is provided a method for holding down a microscope sample, comprising: providing a sample-maintaining assembly comprising a sample-supporting surface and a peripheral wall, the sample-maintaining assembly having a sample-containing cavity at least partially delimited by the sample-supporting surface and an inner peripheral surface of the peripheral wall; providing a microscope sample in the sample-containing cavity onto the sample-supporting surface; arranging a flexible membrane in the sample-containing cavity with the flexible membrane covering the microscope sample and extending at least partially along the inner peripheral surface of the peripheral wall of the sample-maintaining assembly; and inserting an inner member into the sample-containing cavity with the flexible membrane being at least partially sandwiched between the inner peripheral surface of the peripheral wall of the sample-maintaining assembly and an outer peripheral surface of the inner member.

DETAILED DESCRIPTION

Figure 1:
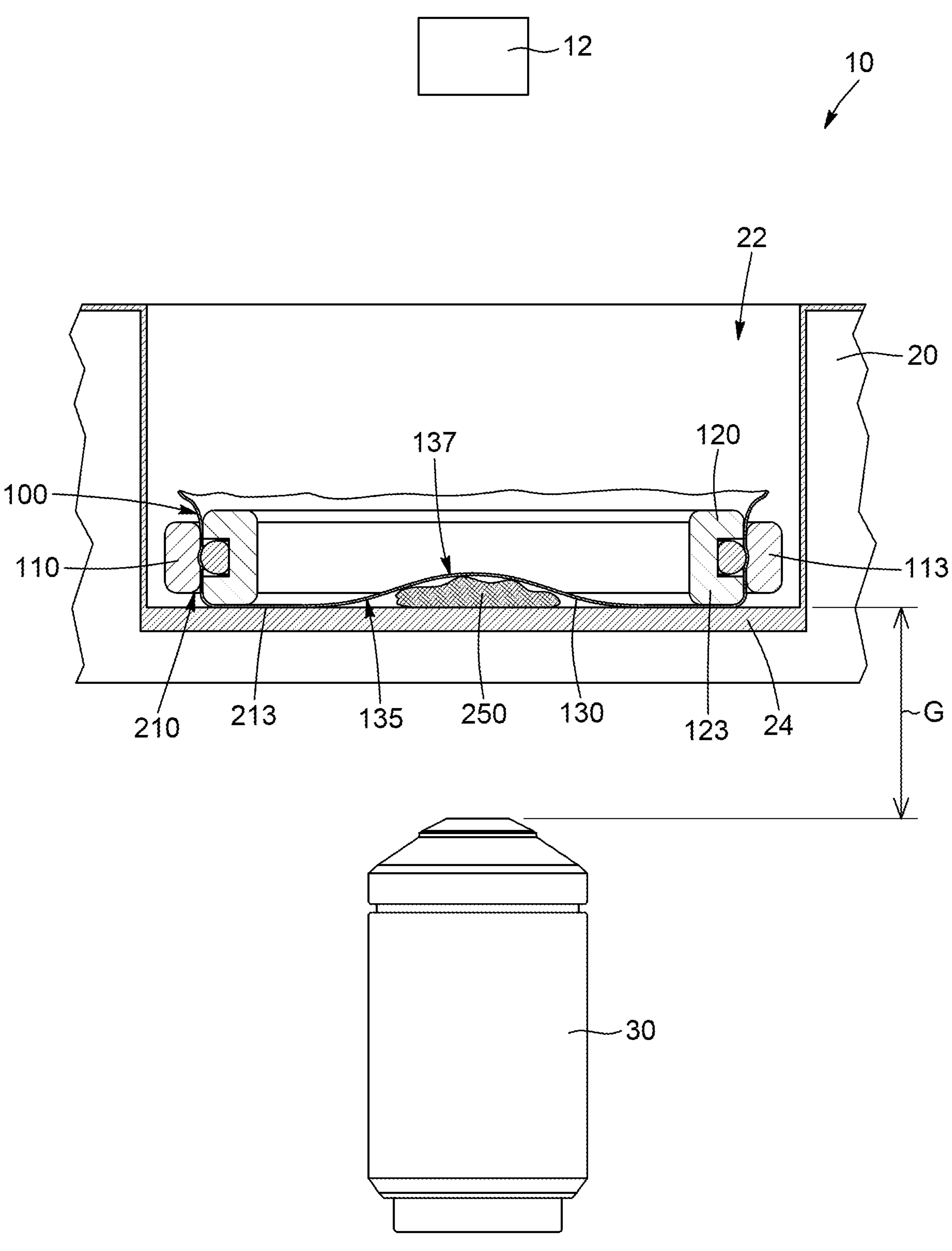
FIG. 1 is a partially cross-section view of a microscope assembly comprising a light source, a microscope objective, a sample container and a sample-maintaining system in accordance with an embodiment.
Figure 2:
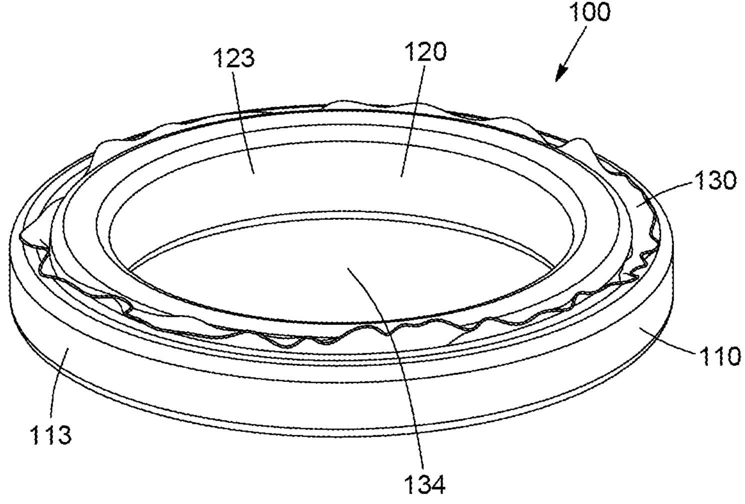
FIG. 2 is top perspective view of the sample-maintaining system of FIG. 1, the sample-maintaining system comprising outer and inner members, and a flexible membrane at least partially sandwiched therebetween.
Figure 3:
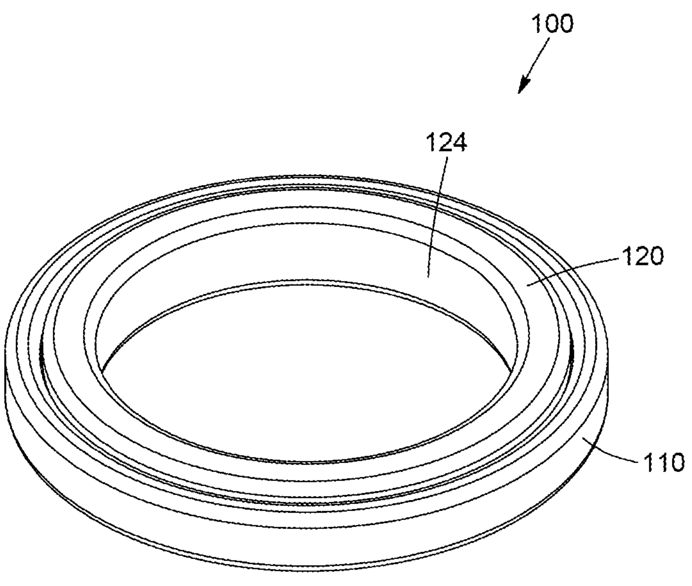
FIG. 3 is top perspective view of the sample-maintaining system of FIG. 2, without the flexible membrane.
Figure 3A:
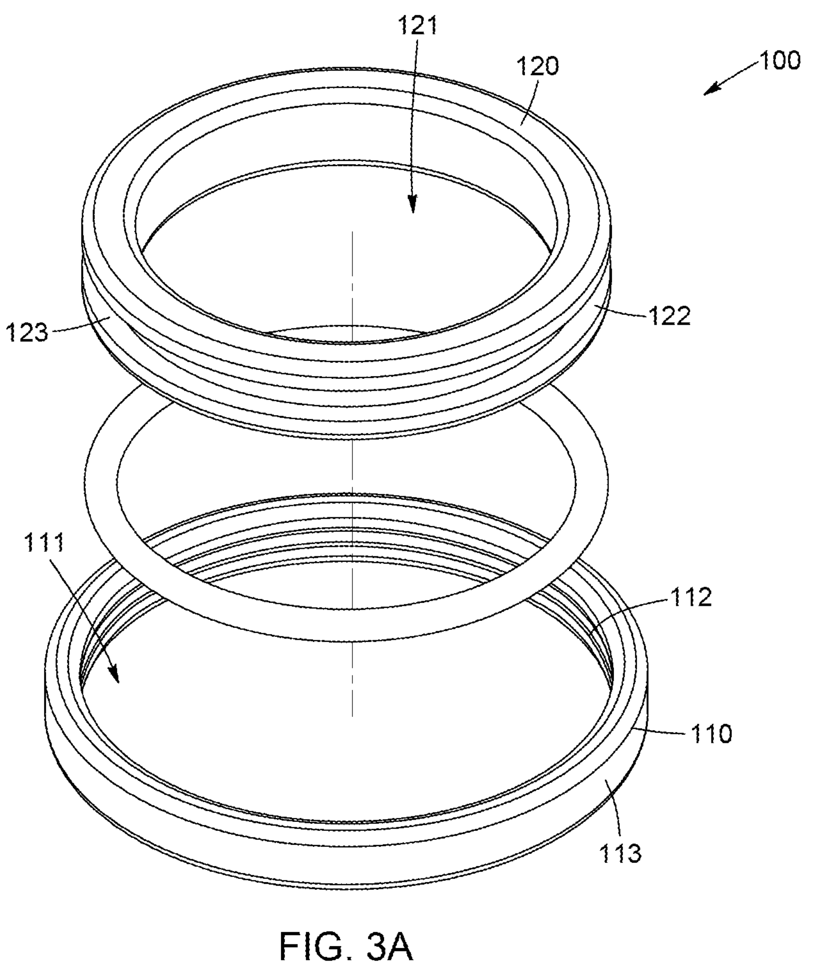
FIG. 3A is a top perspective view, exploded, of the sample-maintaining system of FIG. 3.

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional and are given for exemplification purposes only.

Moreover, it will be appreciated that positional descriptions such as “above”, “below”, “forward”, “rearward”, “left”, “right” and the like should, unless otherwise indicated, be taken in the context of the figures only and should not be considered limiting. Moreover, the figures are meant to be illustrative of certain characteristics of the microscope assembly, the multi-well plate assembly and the sample-maintaining system and are not necessarily to scale.

To provide a more concise description, some of the quantitative expressions given herein may be qualified with the term “about”. It is understood that whether the term “about” is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the following description, an embodiment is an example or implementation. The various appearances of “one embodiment”, “an embodiment” or “some embodiments” do not necessarily all refer to the same embodiments. Although various features may be described in the context of a single embodiment, the features may also be provided separately or in any suitable combination. Conversely, although the invention may be described herein in the context of separate embodiments for clarity, it may also be implemented in a single embodiment. Reference in the specification to “some embodiments”, “an embodiment”, “one embodiment” or “other embodiments” means that a particular feature, structure, or characteristic described in connection with the embodiments is included in at least some embodiments, but not necessarily all embodiments.

It is to be understood that the phraseology and terminology employed herein is not to be construed as limiting and are for descriptive purpose only. The principles and uses of the teachings of the present disclosure may be better understood with reference to the accompanying description, figures and examples. It is to be understood that the details set forth herein do not construe a limitation to an application of the disclosure. Furthermore, it is to be understood that the disclosure can be carried out or practiced in various ways and that the disclosure can be implemented in embodiments other than the ones outlined in the description above. It is to be understood that the terms "including", "comprising", and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element. It is to be understood that where the claims or specification refer to "a" or "an" element, such reference should not be construed as meaning that there is only one of that element. It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. It will be appreciated that the methods described herein may be performed in the described order, or in any suitable order.

Microscope Assembly

Referring now to the drawings, and more particularly to FIG. 1, there is shown a microscope assembly 10.

In the embodiment shown, the microscope assembly 10 comprises a light source 12, a sample container 20 (for instance a multi-well plate assembly, as described below) receiving light from the light source, the sample container 20 defining at least one sample-receiving cavity 22 and comprising a substantially transparent bottom wall 24 at least partially delimiting the sample-receiving cavity 22. The microscope assembly 10 further comprises a sample-maintaining system 100 (or tissue-maintaining system 100 or slice-maintaining system 100) according to the present disclosure arranged (i.e., at least partially contained) in the sample-receiving cavity 22 of the sample container 20 and supported onto the bottom wall 24 (on an inner surface thereof) of the sample container 20. The microscope assembly 10 further comprises a microscope objective 30 arranged below the bottom wall 24 of the sample container 20.

In use, a sample 250 (for instance a tissue, a slice or any other element to be studied and/or observed with the microscope assembly 10) is positioned (or arranged) between a flexible membrane 130 of the tissue-maintaining system 100 and the bottom wall 24 (an upper surface or sample-facing surface or inner surface, considered with regard to the sample-receiving cavity thereof) of the sample container 20. It is thus understood that, considered in a substantially upward vertical direction, and starting from the microscope objective 30, the arrangement of the different components of the microscope assembly 10 comprises the microscope objective 30, a gap G (sometimes referred to as a working distance), for instance at least partially filled with air or immersion oil, the bottom wall 24 of the sample container 20, the tissue or sample 250, the flexible membrane 130 substantially covering the tissue or sample 250 and the light source 12. For instance, the sample-receiving cavity 22 of the container 20 is at least partially filled with liquid, for instance water, during use. For instance, the gap G (or working distance G) is defined between an upper end portion of the microscope objective 30 and the inner surface 25 (or sample-facing surface 25) of the bottom wall 24 of the sample container 20.

It is thus understood that the microscope assembly 10 is used in a transmitted light imaging mode. In other words, a light comes from the light source 12 then passes through the sample container 20 and the sample-maintaining system 100 at least partially contained in one of the sample-containing cavities 22 thereof then goes into the microscope objective 30. In the embodiment shown, the bottom wall 24 of the sample container 20 is at least partially made of glass but it could be made of any other rigid and/or substantially transparent material, for instance and without being limitative, at least partially made of plastic (polypropylene, polyethylene and the like).

It is appreciated that the shape, and the configuration of the microscope assembly, and the relative arrangement of the components thereof, can vary from the embodiment shown. For instance, it could be conceived a microscope assembly wherein the arrangement of the light source and the microscope objective would be in a reversed order (i.e., wherein considered in a substantially upward vertical direction, the arrangement of the different components of the microscope assembly would comprise the light source, the bottom wall of the sample container, the tissue or sample, the flexible membrane and the microscope objective; the microscope objective may or may not be immerged in a liquid).

Sample-Maintaining System (or Sample-Holding System, or Sample-Retaining System)

Referring for instance to FIGS. 1 to 4A, the sample-maintaining system 100 is shown. In the embodiment shown, the sample-maintaining system 100 comprises an outer member 110 having an inner peripheral surface 112 and defining an inner member-receiving through opening 111 at least partially delimited by the inner peripheral surface 112. The sample-maintaining system 100 further comprises an inner member 120 defining a sample-receiving through opening 121 and having an outer peripheral surface 122, the inner member 120 being removably arrangeable (i.e., being shaped and dimensioned to be at least partially removably containable) in the inner member-receiving through opening 111 of the outer member 110. In other words, the sample-maintaining system 100 is configurable into an assembled configuration, wherein the inner member 120 is removably arranged in the inner member-receiving through opening of the outer member 110 with the outer peripheral surface facing at least partially the inner peripheral surface of the outer member.

The sample-maintaining system 100 further comprises the above-mentioned flexible membrane 130. In the embodiment shown, the flexible membrane 130 comprises a peripheral border 132 at least partially sandwiched between the outer peripheral surface 122 of the inner member 120 and the inner peripheral surface 112 of the outer member 110, and a sample-maintaining portion 134 (for instance a central portion of the flexible membrane 130 or any portion of the flexible membrane at least partially surrounded by the peripheral border 132 of the flexible membrane 130) extending substantially across the sample-receiving through opening 121 at least partially delimited by an inner peripheral surface 124 of the inner member 120. In other words, the outer member 110 comprises a peripheral wall 113 at least partially bordering the inner member-receiving through opening 111 and the inner member 120 comprises a peripheral wall 123 at least partially bordering the sample-receiving through opening 121. The flexible member 130 (at least the peripheral border 132 thereof, in the embodiment shown) is at least partially sandwiched between the peripheral wall 113 of the outer member 110 (the inner peripheral surface 112 thereof) and the peripheral wall 123 of the inner member 120 (the outer peripheral surface 122 thereof), when the sample-maintaining system 100 is in the assembled configuration (i.e., when the inner member 120 is at least partially surrounded by the outer member 110). In yet other words, in the assembled configuration of the sample-maintaining system 100, the flexible membrane 130 is at least partially maintained between the outer peripheral surface 122 of the inner member 120 and the inner peripheral surface 112 of the outer member 110 and at least partially closes the sample-receiving through opening 121 defined by the inner member 120.

In other words, in the embodiment shown, the sample-maintaining system 100, when in the assembled configuration, comprises outer and inner concentrical rings 110, 120 and a flexible membrane 130 at least partially sandwiched between the outer and inner concentrical rings 110, 120 and covering a bottom end portion 125 of the inner ring 120.

Flexible Membrane (or Flexible Film)

In the embodiment shown, the sample-maintaining portion 134 of the flexible membrane 130 has a first sample-facing side 135 and an opposed second side 137 (or upper side, or light-facing side or inner member-supporting side), the inner member 120 being at least partially supported onto the second side 137. In the embodiment shown, the flexible membrane 130 (at least the sample-maintaining portion 134 thereof) is fluid permeable. For instance, the flexible membrane 130 (at least the sample-maintaining portion 134 thereof) comprises a plurality of pores or fluid-circulating apertures formed therein. For instance, at least one of the fluid-circulating apertures has a diameter comprised between about 0.1 micron and 10 microns. In another embodiment, the diameter of at least one of the fluid-circulating apertures is comprised between about 0.2 micron and about 2 microns. For instance, the diameter of at least one of the fluid-circulating apertures is about 0.4 microns.

As detailed below, the flexible membrane 130 (at least the sample-maintaining portion 134 thereof) is at least partially made of a material having a refractive index substantially similar to the refractive index of water. For instance, and without being limitative, the flexible membrane 130 (at least the sample-maintaining portion 134 thereof) is at least partially made of PTFE (Hydrophilic Polytetrafluoroethylene). For instance, the flexible membrane 130 (at least the sample-maintaining portion 134 thereof) has a thickness comprised between about 5 microns and about 200 microns. In another embodiment, the thickness of the flexible membrane 130 is comprised between about 10 microns and about 100 microns. For instance, the thickness of the flexible membrane 130 is about 40 microns.

In the embodiment shown, the flexible membrane 130 is configurable into a substantially transparent configuration (or substantially translucent configuration) (FIG. 6) when wet (for instance when at least partially covered with a liquid such as water, for instance when arranged in the above-mentioned sample-receiving cavity 22 of the sample container 20, the sample-receiving cavity 22 being at least partially filled with liquid). The flexible membrane 130 is also configurable into a substantially opaque configuration (FIG. 5) when dry.

It is appreciated that the shape, the configuration, and the composition of the flexible membrane 130 can vary from the embodiment shown.

Inner and Outer Members

In the embodiment shown, at least one of the outer and inner members 110, 120 is substantially ring-shaped. For instance and without being limitative, at least one of the outer and inner members 110, 120 is substantially toroidally-shaped (i.e., the peripheral wall 113, 123 of at least one of the outer and inner members 110, 120 has a substantially circular cross-section).

Figure 4:
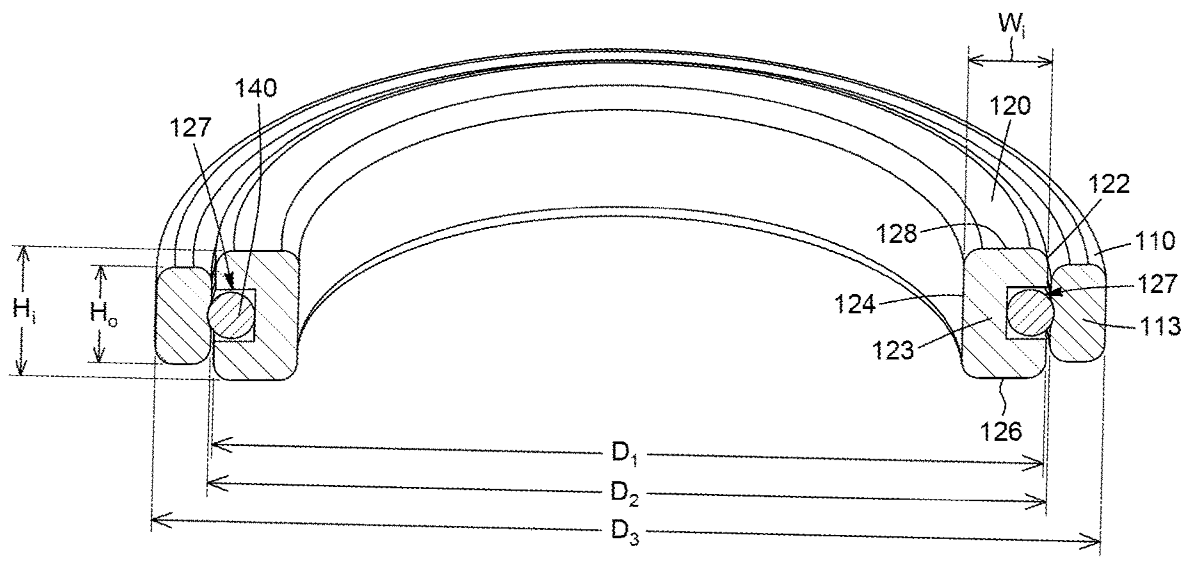
FIG. 4 is a cross-section view of the sample-maintaining system of FIG. 3.
Figure 4A:
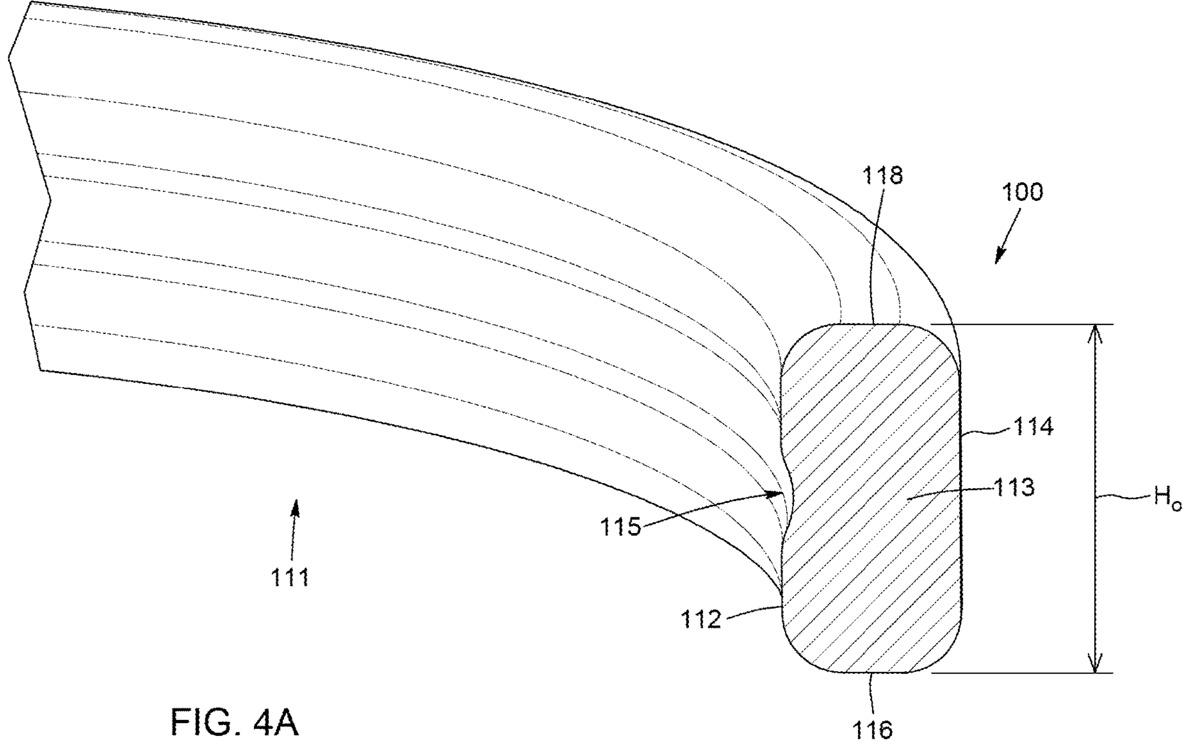
FIG. 4A is an enlarged view of the outer member of the sample-maintaining system of FIG. 4.

In the embodiment shown, as represented for instance in FIGS. 4 and 4A, the peripheral wall 113 of the outer ring 110 (or outer member 110) has a substantially rectangular cross-section. For instance, the peripheral wall 113 comprises the above-mentioned inner peripheral surface 112, an outer peripheral surface 114, for instance substantially parallel to the inner peripheral surface 112. The peripheral wall 113 further comprises a bottom-facing surface 116 and an opposed upper surface 118 extending between the inner and outer peripheral surfaces 112, 114, for instance substantially parallel to each other. In the embodiment shown, the peripheral wall 113 comprises four substantially rounded corners.

In the embodiment shown, a joint-receiving peripheral groove 115 (or joint-receiving peripheral concavity 115 or positioning peripheral concavity 115) is formed in the inner peripheral surface 112 of the peripheral wall 113. In the embodiment shown, the joint-receiving peripheral groove 115 is substantially rounded; any other shape could be conceived. For instance, the joint-receiving peripheral groove 115 extends substantially along an entirety of a periphery of the outer member 110. As best shown in FIG. 4A, considered along a height Ho of the outer member 110, the joint-receiving peripheral groove 115 is substantially equidistant from the bottom-facing surface 116 (or lower wall portion 116) and the opposed upper surface 118 (or upper wall portion 118) of the outer member 110 (of the peripheral wall 112 thereof). In other words, considered along the height Ho of the outer member 110, the joint-receiving peripheral groove 115 is substantially centered. In the embodiment shown, the inner peripheral groove 115 extends substantially along a third of the height Ho of the outer member 110.

In the embodiment shown, as best shown in FIG. 4, the peripheral wall 123 of the inner ring 120 (or inner member 120) has a substantially rectangular cross-section. For instance, the peripheral wall 123 comprises the above-mentioned inner and outer peripheral surfaces 124, 122, for instance substantially parallel to each other. The peripheral wall 123 further comprises a bottom-facing surface 126 (or lower wall portion 126 or bottom-contacting surface 126) and an opposed upper surface 128 (or upper wall portion 128) extending between the inner and outer peripheral surfaces 124, 122, for instance substantially parallel to each other. In the embodiment shown, the peripheral wall 123 comprises four substantially rounded corners.

In the embodiment shown, a joint-receiving peripheral groove 127 (or joint-receiving peripheral concavity 127 or positioning peripheral concavity 127) is formed in the outer peripheral surface 122 of the peripheral wall 123 of the inner member 120. In the embodiment shown, the joint-receiving peripheral groove 127 has a substantially square or rectangular cross-section; any other shape, such as a substantially rounded shape, could be conceived. For instance, the joint-receiving peripheral groove 127 extends substantially along an entirety of a periphery of the inner member 120. As best shown in FIG. 4, considered along a height Hi of the inner member 120, the joint-receiving peripheral groove 127 is substantially equidistant from the bottom-facing surface 126 (or lower wall portion 126) and the opposed upper surface 128 (or upper wall portion 128) of the inner member 120 (of the peripheral wall 122 thereof). In other words, considered along the height Hi of the inner member 120, the joint-receiving peripheral groove 127 is substantially centered. In the embodiment shown, the inner peripheral groove 127 extends substantially along a half of the height Hi of the inner member 120. In the embodiment shown, the joint-receiving peripheral groove 127 extends inwardly along more than about 20% of the width Wi of the inner member 120. For instance, the joint-receiving peripheral groove 127 extends inwardly along about a half of the width Wi of the inner member 120.

In the embodiment shown, an outer cross-section D1 (an outer diameter, when the inner member 120 is substantially ring-shaped) of the inner member 120 is equal to or slightly smaller than an inner cross-section D2 (an inner diameter, when the outer member 110 is substantially ring-shaped) of the outer member 110. For instance, the outer cross-section D1 is comprised between about 5 mm and about 100 mm. In another embodiment, the outer cross-section D1 is comprised between about 10 mm and about 80 mm. In another embodiment, the outer cross-section D1 is comprised between about 20 mm and about 40 mm. In another embodiment, the outer cross-section D1 is comprised between about 27 mm and about 30 mm. In another embodiment, the outer cross-section D1 is about 28.5 mm. For instance, an outer cross-section D3 (an outer diameter, when the outer member 110 is substantially ring-shaped) of the outer member 110 is comprised between about 10 mm and about 200 mm. In another embodiment, the outer cross-section D3 is comprised between about 20 mm and about 150 mm. In another embodiment, the outer cross-section D3 is comprised between about 30 mm and about 40 mm. In another embodiment, the outer cross-section D3 is comprised between about 31 mm and about 35 mm. In another embodiment, the outer cross-section D3 is about 33 mm.

In the embodiment shown and without being limitative, the height Hi of the inner member 120 is greater than the height Ho of the outer member 110. It could however be conceived a sample-maintaining system wherein a height of the inner member would be smaller than or substantially equal to a height of the outer member. In the embodiment shown, for instance, the height Hi of the inner member 120 is greater than about 110% of the height Ho of the outer member 110. In another embodiment, the height Hi of the inner member 120 is greater than about 120% of the height Ho of the outer member 110. In yet another embodiment, the height Hi of the inner member 120 is greater than about 130% of the height Ho of the outer member 110. In yet another embodiment, the height Hi of the inner member 120 is greater than about 140% of the height Ho of the outer member 110.

For instance, the height Ho of the outer member 110 is comprised between about 1 mm and about 15 mm. In another embodiment, the height Ho of the outer member 110 is comprised between about 2 mm and about 10 mm. In another embodiment, the height Ho of the outer member 110 is comprised between about 3 mm and about 6 mm. In another embodiment, the height Ho of the outer member 110 is comprised between about 3.5 mm and about 4.5 mm. For instance, the height Ho of the outer member 110 is about 4 mm, for instance about 3.8 mm. For instance, the height Hi of the inner member 120 is comprised between about 2 mm and about 15 mm. In another embodiment, the height Hi of the inner member 120 is comprised between about 3 mm and about 10 mm. In another embodiment, the height Hi of the inner member 120 is comprised between about 4 mm and about 8 mm. In another embodiment, the height Hi of the inner member 120 is comprised between about 5 mm and about 6 mm. For instance, the height Hi of the inner member 120 is about 5.6 mm.

In the embodiment shown, at least one of the inner and outer members 120, 110 is at least partially formed of a material having a density high enough to maintain the flexible membrane in a substantially flat configuration or in a sample-contacting configuration when a sample is arranged between the inner surface 25 of the bottom wall 24 of the sample container and the sample-facing side of the sample-maintaining portion 134 of the flexible membrane 130. For instance, at least one of the inner and outer members is at least partially formed of a substantially dense and/or corrosion-resisting material (for instance at least partially made of brass, stainless steel and the like). For instance, a first one of the inner and outer members is at least partially made of a substantially rigid and/or substantially dense material, and the other one of the inner and outer members is at least partially made of a substantially flexible material, in order to easily fit with the first one of the inner and outer members. For instance, the other one of the inner and outer members is at least partially made of Viton, Aflas, silicone, FEP-Encapsulated Viton and the like.

In the embodiment shown, the inner and outer members are each single-pieced members.

It is appreciated that the shape, the configuration, the dimensions and the composition of the inner and outer members can vary from the embodiment shown.

Sealing Member

In the embodiment shown, the sample-maintaining system 100 further comprises a sealing member 140 (or O-ring, or joint 140) removably arrangeable between the inner and outer members and at least partially maintained between the inner and outer members, when the sample-maintaining system 100 is in the assembled configuration.

As best shown in FIG. 4, the sealing member 140 is substantially toroidal and is shaped and dimensioned to provide a fluid-tight contact between the inner and outer members (i.e., between the outer peripheral surface of the inner member and the inner peripheral surface of the outer member). In the embodiment shown, the sealing member 140 is shaped and dimensioned to be at least partially received in the joint-receiving peripheral grooves 127, 115 formed in the inner and outer members and substantially in register with each other when the sample-maintaining system 100 is in the assembled configuration. Besides providing a fluid-tight contact between the outer peripheral surface of the inner member and the inner peripheral surface of the outer member, the sealing member and the specific centered arrangement of the joint-receiving peripheral grooves considered along the respective height of the inner and outer members contribute to the accuracy of the relative positioning of the inner and outer members when the sample-maintaining system is in the assembled configuration.

In other words, in the embodiment shown wherein the height of the outer member is smaller than the height of the inner member, and wherein the joint-receiving peripheral grooves are substantially centered along the respective height of the inner and outer members, the arrangement of the sealing member 140 is the joint-receiving peripheral grooves contributes to the centering, considered along their height, of the outer member relatively to the inner member. In other words, when in the assembled configuration with the sealing member received in the joint-receiving peripheral grooves, considered along a height of the sample-maintaining system, the upper and lower wall portions of the outer member are inwardly spaced apart respectively from the upper and lower wall portions of the inner members. In other words, when assembled with the bottom-contacting surface of the inner member supported onto a supporting surface (for instance onto a container bottom wall), the bottom-facing surface of the outer member is spaced apart from the bottom contacting surface of the inner member (i.e., is spaced apart from the container bottom wall). Due to the relative heights of the inner and outer members, when in the assembled configuration with the bottom-contacting surface of the inner member supported onto the supporting surface, considered along the height of the sample-maintaining system 110, the upper wall portion 128 of the inner member 120 is above the upper wall portion 118 of the outer member 110.

It is appreciated that the shape, the configuration, and the location of the sealing member can vary from the embodiment shown. It could also be conceived a sample-maintaining system with no sealing member that would be distinct from the inner and outer members. For instance, a fluid-tight contact between the inner and outer members, when the sample-maintaining system is in the assembled configuration, could be provided by sealing members formed or provided on at least one of the inner peripheral surface of the outer member and the outer peripheral surface of the inner member.

Sample Container

In the embodiment shown, as represented for instance in FIG. 1, the sample-maintaining system 100 is arranged in one of the sample-receiving cavities 22 of the sample container 20 and supported onto the corresponding bottom wall 24 of the sample container 20.

There is thus provided a sample-maintaining assembly 200 for a microscope, the sample-maintaining assembly 200 comprising the sample container 20 and at least one sample-maintaining system 100 arranged (for instance removably) in one of the sample-receiving cavities 22 of the sample container 20. In other words, the sample-maintaining assembly 200 comprises an outer member assembly 210 defining an inner member-receiving cavity 211 and comprising a substantially transparent sample-supporting surface 213 (a sample-supporting face of the bottom wall 24 of the sample container 20, in the embodiment shown) and a peripheral wall 113 (the peripheral wall 113 of the outer member 110, in the embodiment shown) extending upwardly from the sample-supporting surface 213. In other words, the peripheral wall 113 and the sample-supporting surface 213 at least partially delimit together the inner member-receiving cavity 211. It is thus understood that the inner member-receiving cavity 211 corresponds substantially to the inner member-receiving through opening 111 formed by the outer member 110, with a bottom end portion thereof being closed by the sample-supporting surface 213 (by the sample-supporting face 25 of the bottom wall 24).

The sample-maintaining assembly 200 further comprises the inner member 120 defining the above-mentioned sample-receiving through opening 121, the inner member 120 being arranged (in a removable manner) in the inner member-receiving cavity 211 of the outer member assembly 210. The sample-maintaining assembly 200 also comprises the above-described flexible membrane 130, with the peripheral border 132 thereof being at least partially sandwiched between the outer peripheral surface 122 of the inner member 120 and the peripheral wall 113 of the outer member assembly 210. The sample-maintaining portion 134 of the flexible membrane 130 extends substantially across the sample-receiving through opening 121 and substantially closes the bottom end portion 125 thereof.

In the embodiment shown in FIG. 1, the outer member assembly 210 has a closed bottom end portion and comprises the outer member 110 and the sample-supporting surface 213. In the embodiment shown, the outer member 110 is removably superposed onto the sample-supporting surface 213 formed at least partially by the bottom wall 24 of the sample container 20. It could also be conceived a sample-maintaining assembly wherein the peripheral wall and the sample-supporting surface would be securely fastened to each other or would be formed integral with each other.

It is appreciated that the shape and the configuration of the sample-maintaining assembly, and the relative location of the components thereof, can vary from the embodiment shown. For instance, the present disclosure is not limited to a sample-maintaining system comprising inner and outer members and a flexible membrane (or flexible film) at least partially maintained between an outer peripheral surface of the inner member and an inner peripheral surface of the outer member. It could also be conceived a sample-maintaining system comprising a flexible film having a sample-facing side and an opposed maintaining member-supporting side, the flexible film being for instance at least partially made of a material having a refractive index substantially similar to the refractive index of water; and a single maintaining member defining a sample-receiving through opening superposed onto the maintaining member-supporting side of the flexible film, with the flexible film at least partially closing the sample-receiving through opening of the maintaining member. For instance, the maintaining member is secured (for instance at least partially glued) onto the maintaining member-supporting side of the flexible film.

Well Plate Assembly

Figure 5:
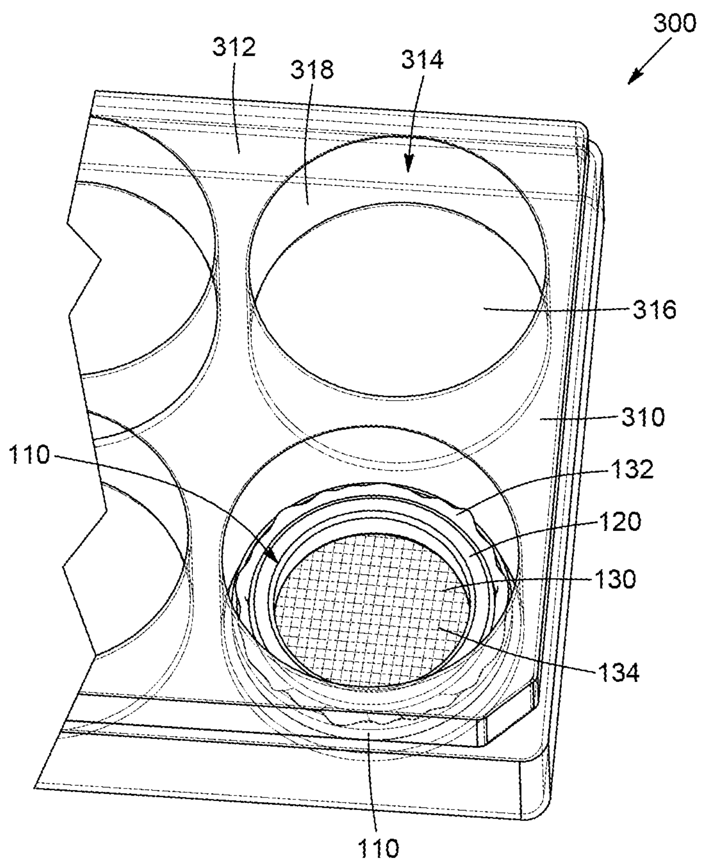
FIG. 5 is a top perspective view of a multi-well plate assembly comprising a multi-well plate comprising a plurality of wells, and the sample-maintaining system of FIG. 2 in one of the wells thereof, the flexible membrane of the sample-maintaining system being in an opaque configuration.
Figure 6:
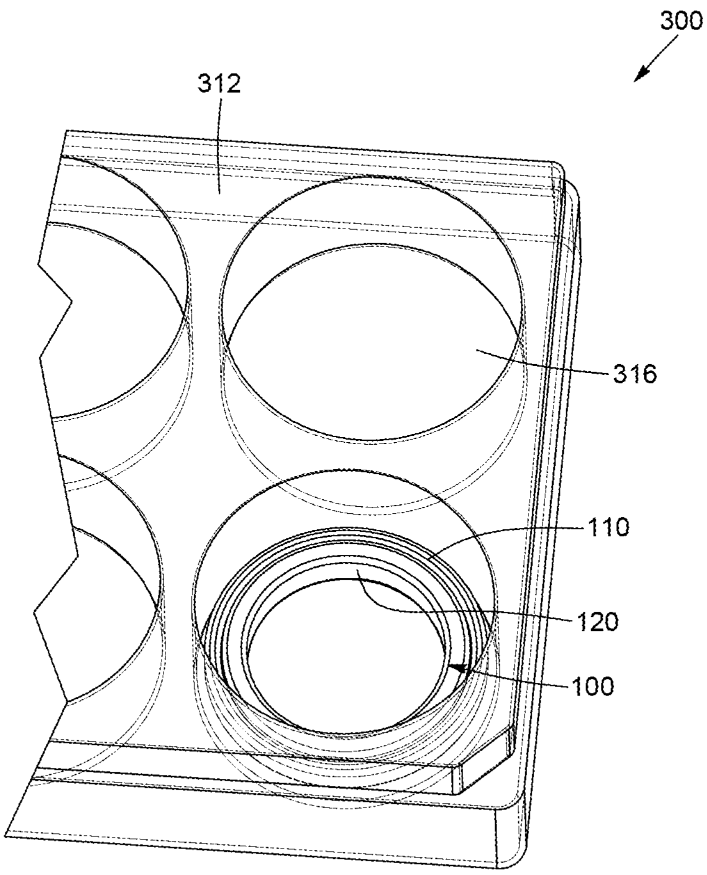
FIG. 6 is a top perspective view of the multi-well plate assembly of FIG. 5, the flexible membrane of the sample-maintaining system being in a transparent configuration.

Referring now to FIGS. 5 and 6, there is shown a well plate assembly 300 (for instance a multi-well plate assembly) comprising a well plate 310 (for instance a multi-well plate) having an upper surface 312, at least one (for instance a plurality, for instance 6) well 314 (for instance substantially cylindrical) being formed in the multi-well plate 310 and opening into the upper surface 312 thereof, wherein the multi-well plate 310 comprises a plurality of lower surface portions 316 spaced apart from the upper surface 312 and a plurality of cylindrical peripheral wall portions 318 extending upwardly from the plurality of lower surface portions 316 to at least partially delimit therewith the plurality of wells 314. The multi-well assembly 300 further comprises at least one sample-maintaining system 100 provided (i.e., arranged or at least partially contained) in one of the plurality of wells 314, wherein the flexible membrane 130 at least partially covers the corresponding lower surface portion 316.

In the embodiment shown, the wells of the multi-well plate are shaped and dimensioned so that the outer member 110 of the sample-maintaining system 100 can be introduced into the well while being stably maintained within the well. In other words, the outer diameter D3 of the outer member 110 is slightly smaller than an inner diameter of the well 314.

The present disclosure is not limited to sample-maintaining systems that would be shaped and dimensioned to be arranged into a well of a multi-well plate (or into a wall of well plate). It is appreciated that the shape and the configuration of the sample-maintaining system, and the shape, the configuration, the dimensions and/or the relative arrangement of the inner and outer members and the flexible membrane thereof can vary from the embodiment shown. It is thus understood that, due to the bottom wall 24 of the sample container 20 (or the lower surface portion of the multi-well plate) being substantially transparent, the through openings formed by the inner and outer members and the properties of the flexible membrane of the sample-maintaining system, the sample-maintaining assembly 200 is substantially transparent at least over an area holding the sample 250 (for instance the tissue 250), thus enabling for instance microscope images of airways to be captured.

As detailed above, a substantially entire area of the sample 250 (for instance the tissue slice 250) is in contact with, and pushed on by, the flexible membrane 130 (the sample-maintaining portion 134 thereof). The inner member 120 being arranged on the second side of the sample-maintaining portion of the flexible membrane 130, the inner member 120 contributes to pushing down the sample-maintaining portion 134 of the flexible membrane onto the sample 250. It is thus understood that the sample 250 is held in place via the sole use of gravity. The tissue sample 250 is thus held in a substantially flat manner (or sample-contacting and holding manner) against the bottom wall 24 (substantially rigid) of the sample container 20 (or against the lower surface portion of the multi-well plate). In other words, the tissue sample 250 is pressed against the substantially transparent sample-supporting surface via the flexible membrane (the sample-maintaining portion thereof). In yet other words, the sample-maintaining system 100 is shaped and dimensioned so that the flexible membrane (the sample-maintaining portion thereof) is kept substantially taught (i.e., in a substantially tight and flat manner) while covering the sample.

It is further understood that a dimension of the gap G between the sample 250 and the microscope objective 30 does not depend on dimensions of the sample-maintaining system 100. The sample-maintaining system 100 can be disassembled and can be easily cleaned (for instance autoclaved).

Method for Holding Down a Microscope Sample

According to another aspect of the disclosure, there is provided a method for holding down a microscope sample. The method according to embodiments of the present disclosure may be carried out with a sample-maintaining system 100 as described above.

In the embodiment shown, the method comprises a step of providing a sample container defining at least one sample-receiving cavity and comprising a substantially transparent sample-supporting surface at least partially delimiting the sample-receiving cavity. The method further comprises a step of providing a microscope sample in the at least one sample-receiving cavity onto the sample-supporting surface. The method further comprises a step of providing a sample-maintaining system comprising: an outer member having an inner peripheral surface at least partially delimiting an inner member-receiving through opening; an inner member defining a sample-receiving through opening and having an outer peripheral surface; and a flexible membrane; wherein the inner member is arranged in the inner member-receiving through opening of the outer member with the outer peripheral surface facing at least partially the inner peripheral surface of the outer member and with the flexible membrane at least partially maintained between the outer peripheral surface of the inner member and the inner peripheral surface of the outer member so as to at least partially close the sample-receiving through opening. The method then comprises a step of inserting the sample-maintaining system into said at least one sample-receiving cavity with the inner member surrounding the microscope sample and with the flexible membrane covering the microscope sample.

In another embodiment, it could be conceived a method for holding down a microscope sample that would comprise providing a sample-maintaining assembly 200 comprising a sample-supporting surface 213 and a peripheral wall 113, the sample-maintaining assembly 200 having a sample-containing cavity 211 (or inner member-receiving cavity 211) at least partially delimited by the sample-supporting surface 213 and an inner peripheral surface 112 of the peripheral wall 113. The method further comprises providing a microscope sample 250 in the sample-containing cavity 211 onto the sample-supporting surface 213, arranging a flexible membrane 130 in the sample-containing cavity 211 with the flexible membrane 130 (at least a portion thereof) covering the microscope sample 250 and extending upwardly at least partially along the inner peripheral surface 112 of the peripheral wall 113 of the sample-maintaining assembly 200. The method further comprises inserting an inner member 120 into the sample-containing cavity 211, the inner member surrounding the sample 250, with the flexible membrane 130 being at least partially sandwiched between the inner peripheral surface of the peripheral wall of the sample-maintaining assembly and an outer peripheral surface 122 of the inner member 120.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited by the scope of the appended claims.

The invention claimed is:

1. A sample-maintaining system for a microscope, the sample-maintaining system comprising:

a flexible film having a sample-facing side and an opposed maintaining member-supporting side;

a maintaining member defining a sample-receiving through opening superposed onto the maintaining member-supporting side of the flexible film, with a sample-maintaining portion of the flexible film extending across the sample-receiving through opening of the maintaining member and substantially closing a bottom end portion of the maintaining member; and an outer member having an inner peripheral surface at least partially delimiting a maintaining member-receiving through opening;

wherein the maintaining member has an outer peripheral surface and is removably arranged in the maintaining member-receiving through opening of the outer member with the outer peripheral surface of the maintaining member facing at least partially the inner peripheral surface of the outer member and with a peripheral border of the flexible film at least partially maintained between the outer peripheral surface of the maintaining member and the inner peripheral surface of the outer member and at least partially closing the sample-receiving through opening.

2. The sample-maintaining system of claim 1, wherein the maintaining member is at least one of ring-shaped and single-pieced.

3. The sample-maintaining system of claim 1, wherein the flexible film is fluid permeable.

4. The sample-maintaining system of claim 1, wherein the flexible film is at least partially made of PTFE.

5. The sample-maintaining system of claim 1, wherein a joint-receiving peripheral groove is formed in at least one of the outer peripheral surface of the maintaining member and the inner peripheral surface of the outer member.

6. The sample-maintaining system of claim 5, wherein, considered along a height of the corresponding one of the maintaining and outer members, said joint-receiving peripheral groove is equidistant from upper and lower wall portions of the corresponding one of the maintaining and outer members.

7. The sample-maintaining system of claim 5, wherein a cross-section of at least one of the maintaining and outer members comprises at least one rounded corner.

8. The sample-maintaining system of claim 5, wherein the outer member is at least one of ring-shaped and single-pieced.

9. The sample-maintaining system of claim 1, further comprising:

a ring-shaped outer member comprising a bottom-facing surface and having an inner peripheral surface at least partially delimiting a maintaining member-receiving through opening;

the maintaining member comprising a bottom-contacting surface and being removably arranged in the maintaining member-receiving through opening of the outer member;

wherein when the bottom-contacting surface of the maintaining member is supported onto a container bottom wall, the bottom-facing surface of the outer member is spaced apart therefrom.

10. The sample-maintaining system of claim 5, wherein considered along a height of the corresponding one of the maintaining and outer members, said joint-receiving peripheral groove is substantially centered.

11. The sample-maintaining system of claim 10, wherein a first joint-receiving peripheral groove is formed in the inner peripheral surface of the outer member and a second joint-receiving groove is formed in the outer peripheral surface of the maintaining member, and wherein considered along the respective height of the maintaining and outer members, each of the first and second joint-receiving peripheral grooves is substantially centered.

12. The sample-maintaining system of claim 1, wherein a cross-section of at least one of the maintaining and outer members is substantially rectangular.

13. The sample-maintaining system of claim 5, further comprising a toroidal joint removably arranged between the outer peripheral surface of the maintaining member and the inner peripheral surface of the outer member and at least partially received within said joint-receiving peripheral groove.

14. The sample-maintaining system according to claim 1, wherein the flexible film is as least partially made of a material having a refractive index substantially similar to the refractive index of water.

15. The sample-maintaining system according to claim 1, wherein an outer cross-section of the maintaining member is equal to or slightly smaller than an inner cross-section of the outer member.

* * * * *